Aug. 12, 1969 R. D. RIVERS ET AL 3,460,322

GAS FILTER MOUNTING STRUCTURE

Filed Oct. 5, 1967

INVENTORS
Richard D. Rivers
BY Jimmie D. York, Jr.

Ralph B. Brick

United States Patent Office 3,460,322
Patented Aug. 12, 1969

3,460,322
GAS FILTER MOUNTING STRUCTURE

Richard D. Rivers and Jimmie D. York, Jr., Louisville, Ky., assignors to American Air Filter Company, Inc., Louisville, Ky., a corporation of Delaware Filed Oct. 5, 1967, Ser. No. 673,092
Int. Cl. B01d 25/00
U.S. Cl. 55—484 2 Claims

ABSTRACT OF THE DISCLOSURE

A gas filter mounting structure for mounting a filter cell so that an edge rim thereof is in sealed relation to a flowthrough support frame including a mounting housing adapted to be attached to the support frame with minimum leakage, the mounting housing having a peripheral border frame face wall which is smooth and uninterrupted by any breaks or welds to receive the filter cell edge in fast sealed relation thereagainst.

Background of the invention

The present invention pertains to an improved apparatus for gas separation, and more particularly, to a new, useful, and unobvious arrangement for mounting an encompassing filter cell edge in fast sealed uninterrupted engagement with a support frame.

A number of filter cell mounting arrangements are known in the art of gas infiltration to secure filter cells in sealed relation to their support frame structures. These past arrangements have included complex, time consuming, and expensive structures to fasten the filter cell to the support frame, and even after the filter cell has been mounted, have required application of edge sealant materials at a multitude of possible leak passages between the filter cell and the support frame.

Summary of the invention

The present invention, recognizing that these past mounting arrangements have presented problems in construction, mounting, sealing, wear, clamping and leakage, as well as problems in filter cell access and removal, provides a filter cell mounting arrangement which is straightforward and economical in construction and maintenance, allowing quick installation and removal of a filter cell unit with minimum leakage and maximum access for installation and removal, at the same time permitting accurate alignment of support superstructure and requiring a minimum application of edge sealant materials.

Various other features of the present invention will become obvious to one skilled in the art upon reading the disclosure set forth herein.

More particularly, the present invention provides an improved gas filter structure for fastening filter cell and interposed gasket means in sealed engagement with a support frame comprising: a support frame having a first flow-through passage therein defined by a support frame face wall; a filter cell flow-through mounting housing including an enclosed side wall sized to surround the flow-through passage of the support frame, the side wall having extending in a substantially normal direction from one edge thereof flanges engaging in facing relation against the support frame face wall and having extending in a substantially normal direction from the opposite edge thereof a peripheral, smooth, and uninterrupted border face wall surrounding and defining a second flow-through passage spaced from and aligned with the first flow-through passage of the support frame to receive the filter cell and gasket means in flush sealing engagement therewith; means to fasten the flanges of the mounting housing to the support frame face wall; and quick disconnect clamping means on the side wall of the mounting housing to engage with a filter cell to hold the edge thereof and an interposed gasket in fast sealed relation against the peripheral, smooth, and uninterrupted face wall of the mounting housing.

Referring to the drawing which discloses one advantageous embodiment of the present invention;

Figures 1, 3:
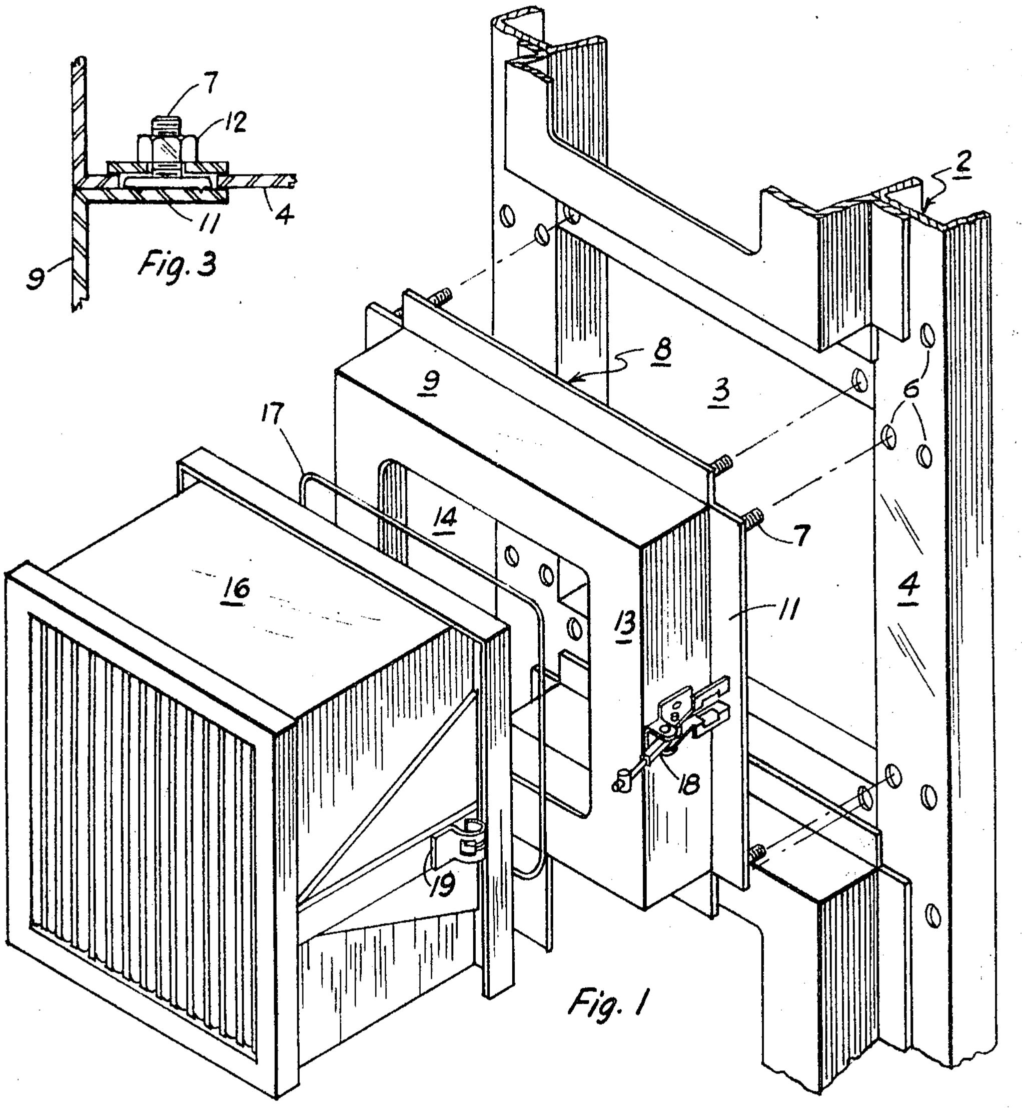
FIGURE 1 is an exploded isometric view of a portion of a support frame disclosing the novel apparatus for mounting filter cell and interposed gasket means to such frame.
FIGURE 3 is an enlarged cross-sectional view of a welded bolt and nut arrangement utilized to fasten the mounting housing to the support frame.
Figure 2:
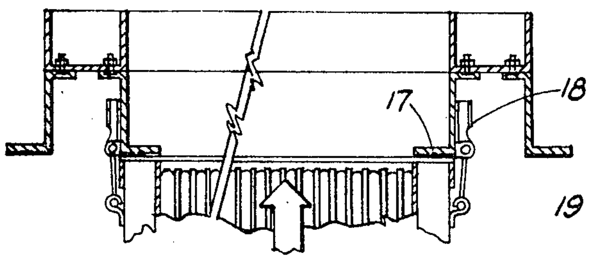
FIGURE 2 is a cross-sectional plan view of the apparatus of FIGURE 1.

Referring to FIGURE 1 of the drawing, a portion of support frame 2 is disclosed which frame serves to provide a plurality of flow-through passages 3. It is to be understood that support frame 2 can be formed in any one of several manners, and as disclosed in the drawing, is comprised of a plurality of spaced structural beams welded together at intervals by cross beams to provide passages 3, each of which is defined by support frame face wall 4. In this connection, it also is to be noted that support frame 2 can be sized and shaped to accommodate any number of cell modules to provide an overall frame which can be erected and leveled readily and effectively prior to assembly of the mounting housing and cells as described hereinafter.

Positioned in spaced relation around each of flow-through passages 3 in frame 2 are a plurality of apertures 6. Apertures 6 serve to receive bolt members 7 which have their heads fastened to mounting housing 8 in suitable spaced relation to cooperate with spaced apertures 6—all in a novel manner as described hereinafter.

Mounting housing 8 includes enclosed side wall 9 sized to surround flow-through passage 3. Extending in a substantially normal direction from one edge thereof are flanges 11. Flanges 11 are positioned to engage in faced relationship against support frame face wall 4.

Referring particularly to FIGURE 3, it is to be noted that the heads of bolt 7 are of a type known in the art which permits their welding to that face of flange 11 which engages against support frame face wall 4. With such an arrangement, rather than one wherein bolts 7 are arranged to pass through the aligned aperture and flanges, additional areas of possible leakage are avoided, it being necessary only to supply a suitable sealant between the edges of flanges 11 and face wall 4, once the bolts 7 have been passed through the aperture 6 and suitable nut and washer assemblies 12 are tightly fastened thereon.

Extending inwardly in a substantially normal direction from the opposite edge of side wall 9 from that edge having flanges 11 is peripheral, smooth, and uninterrupted border face wall 13. Face wall 13 is sized to surround and define a second flow-through passage 14 which is spaced from and aligned with flow-through passage 4 of support frame 2. Face wall 13 serves to receive the encompassing peripheral edge of filter cell 16 and interposed gasket 17 in flush sealing engagement therewith. It is to be noted that because of the smooth, uninterrupted surface of wall 13 without welds or joints, the possible areas of gas leakage are substantially reduced. At the same time, it is possible to form gasket 17 from a material which is highly resistant to compressibility. It is to be understood that mounting housing 8 with its flanges 11 and smooth and uninterrupted peripheral face wall 13 can be bent formed from a suitable blank sheet of metal with side wall 9 being seam welded at its respective corners. It also is to be understood that it is possible to cast the entire housing 8 to avoid weld seams at the corners of the side wall.

To maintain the edge of filter cell 16 in fast sealed position against peripheral face wall 13, suitable over center clamps 18 are provided on side wall 9, clamps 18 engaging with keepers 19 mounted on cell 16 in a reinforced manner. With such an arrangement it is possible to quickly connect filter cell 16 to mounting housing 8 in fast sealed relation with a minimum of effort. At the same time, in the event cell 16 is undesirably contaminated, it is possible to slip a suitable disposable-type bag readily over the cell and remove the same without human contact.

The invention claimed is:

1. An improved gas filter structure assembly comprising: a plurality of filter cells each having a plurality of opposed pairs of side walls defining a frame open at the front and provided with an open peripheral rear face edge and including a filter medium extending between the side walls, keeper means mounted on a pair of opposed side walls of each cell; gasket means cooperable with a peripheral face edge of each of said filter cells placed in sealed engagement therewith; a support frame including a planar front face wall for said filter cells having a plurality of first flow-through side-by-side spaced passages therein each defined by the support frame face wall; a plurality of filter cell flow-through mounting housings, each including an enclosing side wall defining a passage registering with one said flow-through passage of said support frame, said side wall having extending outwardly therefrom in a substantially normal direction from one edge thereof flanges engaging in facing relation against the support frame face wall and having extending in a substantially normal direction inwardly from the opposite edge thereof a peripheral, smooth, and uninterrupted planar border face wall surrounding and defining a second flow-through passage spaced from and aligned with said flow-through passage of said support frame receiving said filter cell with said gasket means interposed therebetween in flush sealing engagement therewith; means to fasten said flanges of each of said mounting housings to said support frame face wall; and over center latch actuated quick disconnect clamping means on a pair of corresponding opposite side walls of each of said mounting housings to engage with said keeper means on the opposed walls of said filter cell to hold the peripheral rear face edge thereof and the interposed gasket in fast sealed relation against said peripheral smooth and uninterrupted border face wall of said mounting housing.

2. The apparatus of claim 1, said means to fasten said flanges of said mounting housing to said support frame face including a plurality of spaced apertures in said support frame adjacent said first flow-through passage, a plurality of bolt members aligned with said apertures to pass therethrough, said bolt members having their heads welded to the face of said flanges and nut members cooperable with said bolts to hold the same in fast position.

References Cited

UNITED STATES PATENTS

| | | | |
|---|---|---|---|
| 2,552,847 | 5/1951 | Farr et al. | 55—483 |
| 2,884,091 | 4/1959 | Baldwin | 55—502 |
| 3,131,044 | 4/1964 | Springer | 55—502 |
| 3,158,457 | 11/1964 | Whitfield. | |
| 3,250,063 | 5/1966 | Andrews | 55—483 |
| 3,350,862 | 11/1967 | Nutting | 55—490 |
| 3,360,910 | 1/1968 | Soltis | 55—502 |
| 3,370,408 | 2/1968 | Lehrer et al. | 55—502 |
| 3,229,609 | 1/1966 | Larson et al. | |

FOREIGN PATENTS

| | | |
|---|---|---|
| 1,342,931 | 10/1963 | France. |
| 998,032 | 7/1965 | Great Britain. |

HARRY B. THORNTON, Primary Examiner

BERNARD NOZICK, Assistant Examiner

U.S. Cl. X.R.

55—490, 502, 504